US012735116B2

(12) United States Patent
Gusmini

(10) Patent No.: US 12,735,116 B2
(45) Date of Patent: Sep. 15, 2026

(54) HINGE DEVICE AND PASSENGER CAR EQUIPPED WITH SAME

(71) Applicant: Bayerische Motoren Werke Aktiengesellschaft, Munich (DE)

(72) Inventor: Roberto Gusmini, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 412 days.

(21) Appl. No.: 18/546,887

(22) PCT Filed: Dec. 10, 2021

(86) PCT No.: PCT/EP2021/085240

§ 371 (c)(1),
(2) Date: Aug. 17, 2023

(87) PCT Pub. No.: WO2022/174954

PCT Pub. Date: Aug. 25, 2022

(65) Prior Publication Data

US 2024/0124069 A1 Apr. 18, 2024

(30) Foreign Application Priority Data

Feb. 18, 2021 (DE) ..................... 10 2021 103 876.6

(51) Int. Cl.
*B62D 25/10* (2006.01)
*E05D 1/04* (2006.01)
*E05D 11/00* (2006.01)

(52) U.S. Cl.
CPC ............. *B62D 25/105* (2013.01); *E05D 1/04* (2013.01); *E05D 11/0054* (2013.01); *E05Y 2900/546* (2013.01); *E05Y 2900/548* (2013.01)

(58) Field of Classification Search
CPC ...... B62D 25/105; E05D 1/04; E05D 11/0054
(Continued)

(56) References Cited

U.S. PATENT DOCUMENTS 2,947,025 A 8/1960 Campbell et al.
10,221,596 B1 3/2019 Cruz Lopez et al.
(Continued)

FOREIGN PATENT DOCUMENTS

CN 102995991 A 3/2013
CN 111661168 A 9/2020
(Continued)

OTHER PUBLICATIONS

Machine translation of Bauhaus et al. (DE 102006028008), published Jan. 3, 2008. (Year: 2008).*
(Continued)

*Primary Examiner* — Daniel J Colilla
(74) *Attorney, Agent, or Firm* — Crowell & Moring LLP

(57) ABSTRACT

A curved hinge apparatus includes a curved hinge on which a luggage compartment cover of a vehicle is mountable, where, in an installed position of the curved hinge apparatus in the vehicle, the curved hinge is movable between an open position and a closed position through an opening in a luggage compartment trim of the vehicle which is delimited by a wall. The curved hinge is surrounded by a curved hinge cover. An outer side of the curved hinge cover has, facing away from the luggage compartment cover in the installed position, a portion which expands in a longitudinal direction of the curved hinge cover and which closes the opening in the open position. An inner side of the curved hinge cover has a support portion which abuts against an outer side of the curved hinge and which is spaced apart from the portion of the curved hinge cover.

7 Claims, 4 Drawing Sheets

(58) Field of Classification Search
USPC .................................................... 16/355, 357
See application file for complete search history.

(56) References Cited

U.S. PATENT DOCUMENTS

| | | | |
|---|---|---|---|
| 2016/0251036 A1 | 9/2016 | Zhang et al. | |
| 2021/0123276 A1* | 4/2021 | Molyneux | E05D 11/0054 |

FOREIGN PATENT DOCUMENTS

| | | |
|---|---|---|
| DE | 197 34 320 C2 | 2/1999 |
| DE | 10 2006 028 008 A1 | 1/2008 |
| DE | 10 2018 125 552 A1 | 4/2019 |
| GB | 2570322 A | 7/2019 |

OTHER PUBLICATIONS

PCT/EP2021/085240, International Search Report dated Apr. 20, 2022 (Two (2) pages).
German Search Report issued in German application No. 10 2021 103 876.6 dated Oct. 5, 2021, with Statement of Relevancy (Six (6) pages).
English translation of Japanese-language Office Action issued in Japanese Application No. 2023-535410 dated Oct. 8, 2025 (5 pages).
English translation of Chinese-language Office Action issued in Chinese Application No. 202180079188.1 dated Apr. 16, 2026 (7 pages).

* cited by examiner 5
15
20
10
25
40
35
30
L
z
y
x 30
42
45
L
45
B
35
25
40
47
49
60
65
20
55
50
15
10
S
S
z
y
x

HINGE DEVICE AND PASSENGER CAR EQUIPPED WITH SAME

BACKGROUND AND SUMMARY OF THE INVENTION

The present invention relates to a curved hinge apparatus and a passenger vehicle which is provided therewith.

A curved hinge apparatus which is located in a passenger vehicle serves to configure a luggage compartment cover, consequently a tailgate or a boot lid, to be able to be opened or closed with respect to a luggage compartment, as known, for example, from U.S. Pat. No. 2,947,025 A or US 2016/0251036A1. The curved hinge apparatus has to this end a curved hinge on which the tailgate or boot lid is mounted at one end. At the end opposite this end, the curved hinge can optionally be actively connected to a motor-driven drive mechanism. The curved hinge is supported in such a manner that the relative movement thereof through an opening which is located in a luggage compartment trim of a luggage compartment is enabled.

There is known from DE 10 2006 028 008 A1, DE 197 34 320 C2 and CN 1 11661 168A, a curved hinge apparatus having a curved hinge on which a luggage compartment cover can be mounted and which is configured to be moved between an open position and a closed position through an opening which is located in a luggage compartment trim of a passenger vehicle and which is delimited by a wall. The curved hinge is surrounded by a curved hinge cover which is fixed in position with respect thereto so that the former is substantially covered by the curved hinge cover or, in the assembled state of the curved hinge cover and in particular with the luggage compartment cover in the completely open state, is concealed in the field of vision of a user.

Finally, DE 10 2018 125 552 A1 discloses a curved hinge apparatus having a curved hinge on which a luggage compartment cover can be mounted and which is configured to be moved between an open position and a closed position through an opening which is located in a luggage compartment trim of a passenger vehicle and which is delimited by a wall. The curved hinge known from this specification is constructed in a telescope-like manner and is consequently not surrounded in a fixed manner by a curved hinge cover.

In operational practice, it has been found that, in the region in which the curved hinge is adjacent to the opening in the luggage compartment trim of the luggage compartment, joints which are in an unfavorable manner not always perceived to be aesthetic by an observer are present. Furthermore, apparatuses known from the prior art have the disadvantage of having a complex structure.

An object of the present invention is to overcome this disadvantage.

This object is achieved with a curved hinge apparatus having a curved hinge on which a luggage compartment cover can be mounted and which is configured to be moved between an open position and a closed position through an opening which is located in a luggage compartment trim of a passenger vehicle and which is delimited by a wall, wherein the curved hinge is surrounded by a curved hinge cover which is fixed in position with respect thereto. The curved hinge apparatus according to the invention is characterized in that the outer side of the curved hinge cover has in the region facing away from the luggage compartment cover a portion which expands in the longitudinal direction of the curved hinge cover and which is configured to close the opening in the open position. Furthermore, there is provision according to the invention for the inner side of the curved hinge cover to have at least one support portion which abuts at least partially against the outer side of the curved hinge. The at least one support portion is in this instance, when viewed in the longitudinal direction of the curved hinge cover, spaced apart from the expanding portion of the curved hinge cover.

It should be noted that a complete closure of the joint is provided for according to the invention but is not always possible in practice since in particular temperature-induced component tolerances are intended to be compensated for. If, in this instance, there is discussed an opening which is closed according to the invention, this includes not only the case of a complete closure of the opening by the expanded portion, but also a component-tolerance-related gap between the step and the wall. This gap is, however, compared with the joints known from the prior art, constructed to be considerably smaller and has a width of a maximum of 2 mm, in a particularly preferred manner 1 mm. Furthermore, not only may the gap advantageously be provided in the opening at all sides around the curved hinge cover, but it may also be adjacent only at one side or at two sides. Advantageously, as a result of a surprisingly simple and comparatively cost-effective structure, a visually pleasing and functional cover of the joint known from the prior art is therefore enabled in a manner valued by customers.

It should further be noted that the mentioned wall may be part of the luggage compartment trim which delimits the opening or an additional component, in particular a panel, which is arranged on the edge of the luggage compartment trim so as to at least partially surround it.

As disclosed above, the curved hinge and the curved hinge cover are connected to each other, in particular the curved hinge cover can be clip-fitted or screwed to the curved hinge.

Starting from a closure position, in which the luggage compartment cover closes the luggage compartment, the luggage compartment cover is moved by means of a suitable pivot movement of the curved hinge until it assumes its opening position which releases the luggage compartment. In this instance, the curved hinge and the curved hinge cover which covers it are moved by means of an opening which is located in the luggage compartment trim and which is surrounded by a wall. The size of the joint which is present between the outer face of the luggage compartment trim and the wall is such that the mentioned pivot movement or opening movement of the curved hinge cover with respect to the wall is carried out in a substantially contactless manner. Disruptive noises and surface damage which are produced by an otherwise present friction movement of the elements mentioned are thereby advantageously eliminated.

Of course, the curved hinge cover which covers the curved hinge must have a degree of flexibility in order to be able to compensate for production-related dimensional deviations when it moves in order to assume the closed position and the very large tolerance chain which is linked with the size and number of components considered. On the other hand, the flexibility of the curved hinge cover must not be excessively great in order to have mechanical stability which is also otherwise adequate. There is therefore provision for the region, which is adjacent to the luggage cover, of the curved hinge cover to abut with at least one support portion against the curved hinge, whilst, at the region thereof which is remote from this end, it is spaced apart from the curved hinge. In a particularly preferred manner, there is provision for the portion which expands in the longitudinal direction of the curved hinge cover not to have any support portion. Advantageously, on the one hand, there is thereby provided a measure which increases the rigidity of the curved hinge apparatus close to the luggage compartment cover, on the other hand, a measure which reduces the rigidity in comparison in a region of the curved hinge cover remote from the luggage compartment cover.

On the whole, consequently, the invention advantageously provides a curved hinge apparatus with a resiliently self-centering curved hinge cover.

According to a preferred embodiment of the curved hinge apparatus according to the invention, there is provision for the portion which expands in the longitudinal direction of the curved hinge cover to be in the form of a continuous path or a step which protrudes from the curved hinge cover and at the side thereof facing away from the luggage compartment cover to have a guiding portion which cooperates with the wall. In other words, the curved hinge cover is, with respect to those regions which in the open position are adjacent to the guiding portion, continuously or, in the case of the step, abruptly expanded. Consequently, a guiding portion extends substantially in the vertical vehicle direction of a correspondingly equipped passenger vehicle in such a manner that, in the event of a closure movement of the luggage compartment cover, it abuts at least partially against the wall and is guided and orientated thereby spaced-apart. Portions of the outer side of the curved hinge cover are remote from the guiding portion and are consequently not guided by the guiding portion during a movement of the rear cover. On the whole, it is thereby advantageously made easier for the luggage compartment cover to assume the open position.

In a particularly preferred manner, the guiding portion is located in the curved hinge cover with a protruding step, when viewed in the installation position of the passenger vehicle, outside a field of vision of a user or below the luggage compartment trim. Consequently, the guiding portion is completely covered, which further improves the aesthetic impression of the apparatus according to the invention.

According to another preferred embodiment of the curved hinge apparatus according to the invention, there is provision for the cross sectional surface-area of the curved hinge cover, in the region which is adjacent to the wall in the open position, to be greater than in a region of the curved hinge cover with spacing therefrom. There is thus provision for the curved hinge cover, in the completely open position and when viewed in the longitudinal direction thereof, to have substantially in the region of the guide portion a greater extent in the transverse direction than the regions thereof which are located below and/or above the guiding portion. A curved hinge cover which is both visually particularly appealing and functional is thereby advantageously provided.

According to a particularly preferred embodiment, the proportion of the region which is increased in terms of rigidity over the overall length of the completely extended curved hinge cover is substantially three-quarters, whilst the proportion of the portion which is in contrast reduced in terms of rigidity is substantially a quarter of the overall length of the fully extended curved hinge cover. According to another preferred embodiment, the proportion of the region which is increased in terms of rigidity over the overall length of the completely extended curved hinge cover is substantially a third, whilst the proportion of the portion which is in contrast reduced in terms of rigidity corresponds to substantially two-thirds of the overall length of the completely extended curved hinge cover. According to another preferred embodiment, the proportion of the region which is increased in terms of rigidity over the overall length of the completely extended curved hinge cover is substantially a quarter, whilst the proportion of the portion which is in contrast reduced in terms of rigidity corresponds to substantially three-quarters of the overall length of the completely extended curved hinge cover. Alternatively, there may be provision for the proportion of the region which is increased in terms of rigidity over the overall length of the completely extended curved hinge cover and the proportion of the portion which is in contrast reduced in terms of rigidity to correspond in each case to substantially half of the overall length of the completely extended curved hinge cover. The respective starting point for measuring the distances mentioned above or the proportions thereof over the overall length of the curved hinge cover is located on the region, adjacent to the luggage compartment cover, of the curved hinge cover.

A comparatively simple means for increasing the mentioned rigidity in the region of the luggage compartment cover is advantageously provided when the support portion which abuts against the curved hinge is in the form of a web which protrudes from the curved hinge cover. This is even more the case when a number of the mentioned support portions is provided. These portions may advantageously be in the form of webs which protrude from the inner side of the curved hinge cover in the direction of the curved hinge and which are supported against the curved hinge and/or are supported in receiving members which are provided therein.

The objective mentioned above is also achieved with a passenger vehicle having a luggage compartment which has a luggage compartment trim and which can be selectively opened or closed by means of a luggage compartment cover which is secured at one end to a curved hinge apparatus, wherein the curved hinge apparatus is constructed in accordance with the previously disclosed type. The advantages set out in this regard apply accordingly.

According to a preferred embodiment, there is provision for the wall and the step of the curved hinge cover to form a planar face in the open position. A particularly attractive configuration of the apparatus according to the invention when the luggage compartment cover is open is thereby advantageously provided. However, it is self-evident that a different visual configuration is also possible. The transition between the step of the curved hinge cover and the luggage compartment trim can thus be in the form of a non-planar surface, in particular in the form of an inclination or a shoulder.

As disclosed above, it is advantageous for the moving curved hinge cover to be subjected to a degree of guiding. Advantageously, there is therefore provision for the wall starting from a side opposite the luggage compartment cover to taper in the direction of the luggage compartment cover.

According to a preferred embodiment, there is provision for the guiding portion and the wall to be arranged orthogonally with respect to a virtual plane defined by the luggage compartment trim. This provides not only effective guiding of the curved hinge cover moving through the opening, but also an aesthetic configuration of the step and luggage compartment trim which are located beside each other in the open position of the luggage compartment cover.

With reference to the appended Figures which are not drawn to scale, a detailed, non-prejudicial, in particular non-limiting description of an embodiment of the present invention will be described below.

DETAILED DESCRIPTION OF THE DRAWINGS

Figures 1, 2:
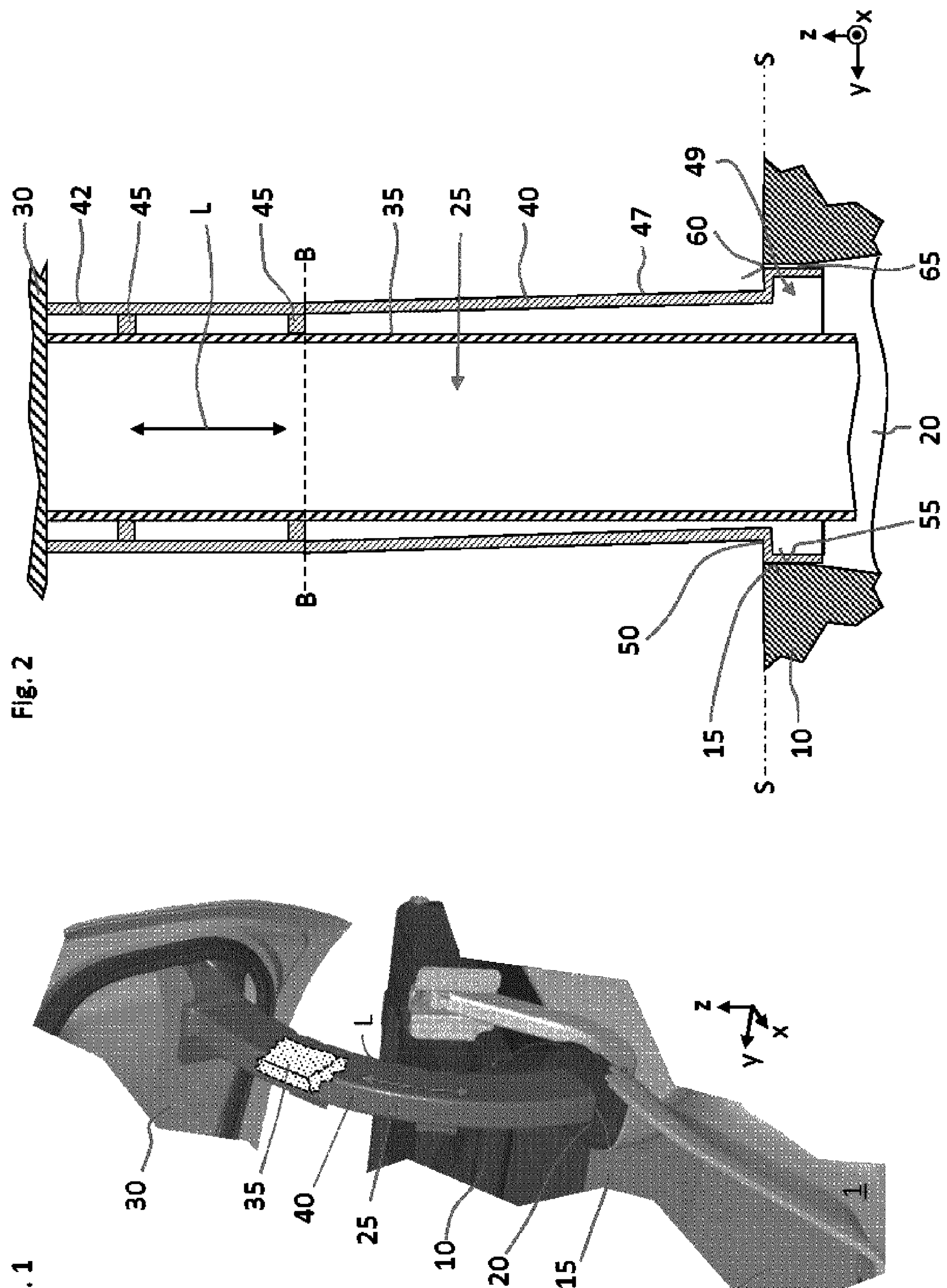
FIG. 1 shows a perspective view of a portion of a passenger vehicle according to the invention with a curved hinge apparatus according to the invention.
FIG. 2 shows a sectioned view through the curved hinge apparatus illustrated in FIG. 1.

FIG. 1 shows a portion of a passenger vehicle 1 according to the invention, the luggage compartment 5 of which has in a manner known per se a luggage trim 10. In the luggage trim 10 there is an opening 20 which is delimited by means of a wall 15 and which has a substantially rectangular cross section. A curved hinge apparatus 25 can be moved manually, or so as to be driven in a motorized manner, through the opening 20 in accordance with the longitudinal direction L thereof, in our counter to the vertical vehicle direction z in order to selectively open or close the luggage compartment 5 in a manner known per se by means of a luggage compartment cover 30 which is secured to an end, which is remote from the luggage compartment trim 10, of the curved hinge apparatus 25. In the position shown in FIG. 1, the luggage compartment cover 30 is completely open and is consequently located in the open position thereof.

The curved hinge apparatus 25 comprises a curved hinge 35 which is illustrated purely schematically in FIG. 1 and which is surrounded at the outer side thereof by means of a curved hinge cover 40. For better understanding of the invention, the curved hinge apparatus 25 of FIG. 1 is shown again in FIG. 2 in a sectioned view. In the upper region thereof in FIG. 2, consequently in the vicinity of the luggage compartment cover 30, the curved hinge cover 40 has at the inner side 42 thereof a series of support portions 45 which abut against the curved hinge 35. The support portions 45 which are according to the embodiment shown here in the form of webs of equal size have when viewed in the x-y plane a substantially U-shaped form and surround the curved hinge 35 at three sides in order to increase the overall rigidity of the curved hinge cover 40 in the upper region mentioned.

In the lower region of the curved hinge apparatus 25, in contrast, consequently in the vicinity of the luggage compartment trim 10, no support portions 45 are provided. Instead, the end, remote from the luggage compartment cover 30, of the curved hinge cover 40 has at the outer side 47 thereof an expanding portion 49 which according to the embodiment shown here is in the form of a circumferential step 50 which moves away or protrudes from the curved hinge 35 and from which a guiding portion 55 extends downward in the longitudinal direction of the curved hinge cover 40 in FIG. 2.

If the luggage compartment cover 30 which is located in a closed position is intended to be opened, the curved hinge apparatus 25 moves through the opening 20 according to FIG. 2 in an upward direction. In order to be able to move the guiding portion 55 of the curved hinge cover 40 more readily into a desired position, the wall 15 is first constructed in a tapering manner in order to then merge into a region which has constant spacing and in which the guiding portion 55 comes to laterally rest against the wall 15. In the shown opening position of the luggage compartment cover 30, the guiding portion 55 abuts in the opening 20 at one side against the wall 15, wherein any relative movement of the lower region of the curved hinge cover 40 with respect to the curved hinge 35 as a result of the lower level of rigidity of the curved hinge apparatus 25 with respect to the upper region, with the exception of the vertical vehicle direction z, is desirable. In the finally assumed closure position according to FIG. 2, the shoulder 50 and the wall 10 further form a substantially stepless planar face 60 which extends according to the embodiment shown in this instance in the x-y plane. A gap 65 between the wall 15 and guiding portion 55 opposite the contact region of the wall 15 and guiding portion 55 is formed, if at all, as a result of tolerances and is notably smaller than a joint, which is known from the prior art, between a wall and a curved hinge (not shown in each case). Consequently, the opening 20 itself and any objects located therein cannot be seen below a viewing range limit S-S by a viewer who is not illustrated in this instance.

It should be noted that, according to this embodiment, the mentioned upper region substantially has a length of a third of the overall length of the curved hinge cover 40 which is completely extended out of the curved hinge cover 40, whilst the lower region mentioned substantially has a length of two-thirds of the overall length of the curved hinge cover 40 which is completely extended out of the curved hinge cover 40. These length relationships schematically illustrated in FIG. 2 by the line B-B are, however, not compulsory; instead, depending on the desired rigidity of the curved hinge apparatus 25, other length relationships may also be provided. It is thus in particular possible to make the comparatively more rigid region shorter using appropriate measures, in particular by means of an arrangement which is closer to the luggage compartment cover 30 and/or an increase of the number and/or a geometric adaptation of portions 45.

Figure 3:
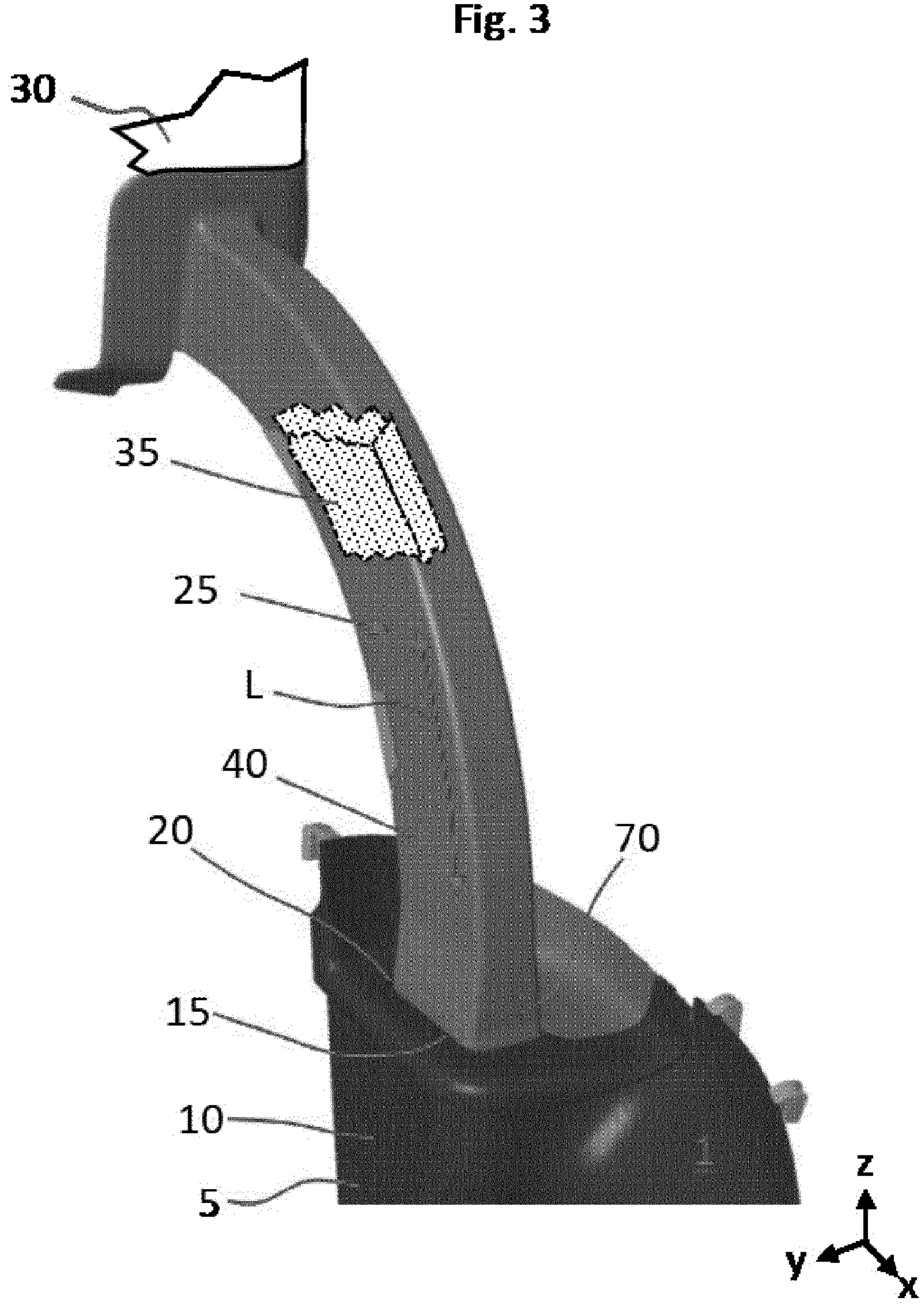
FIG. 3 shows a perspective view of an alternative embodiment of a portion of a passenger vehicle with respect to the embodiment illustrated in FIG. 1, with a curved hinge apparatus.

FIG. 3 shows a perspective view of an alternative embodiment, compared with the embodiment illustrated in FIG. 1, of a portion of a passenger vehicle 1 according to the invention having a curved hinge apparatus 25 according to the invention located in the open position. In this instance, the expanding portion 49 is not in the form of a step, but instead a continuous path 70 the size of which, when viewed in a virtual x-y plane or width, when viewed in the longitudinal direction L, increases from a region closer to the luggage compartment cover 30 in the direction toward the opening 20. According to this embodiment, no support portions 45 are also provided in the last-mentioned region.

Figure 4:
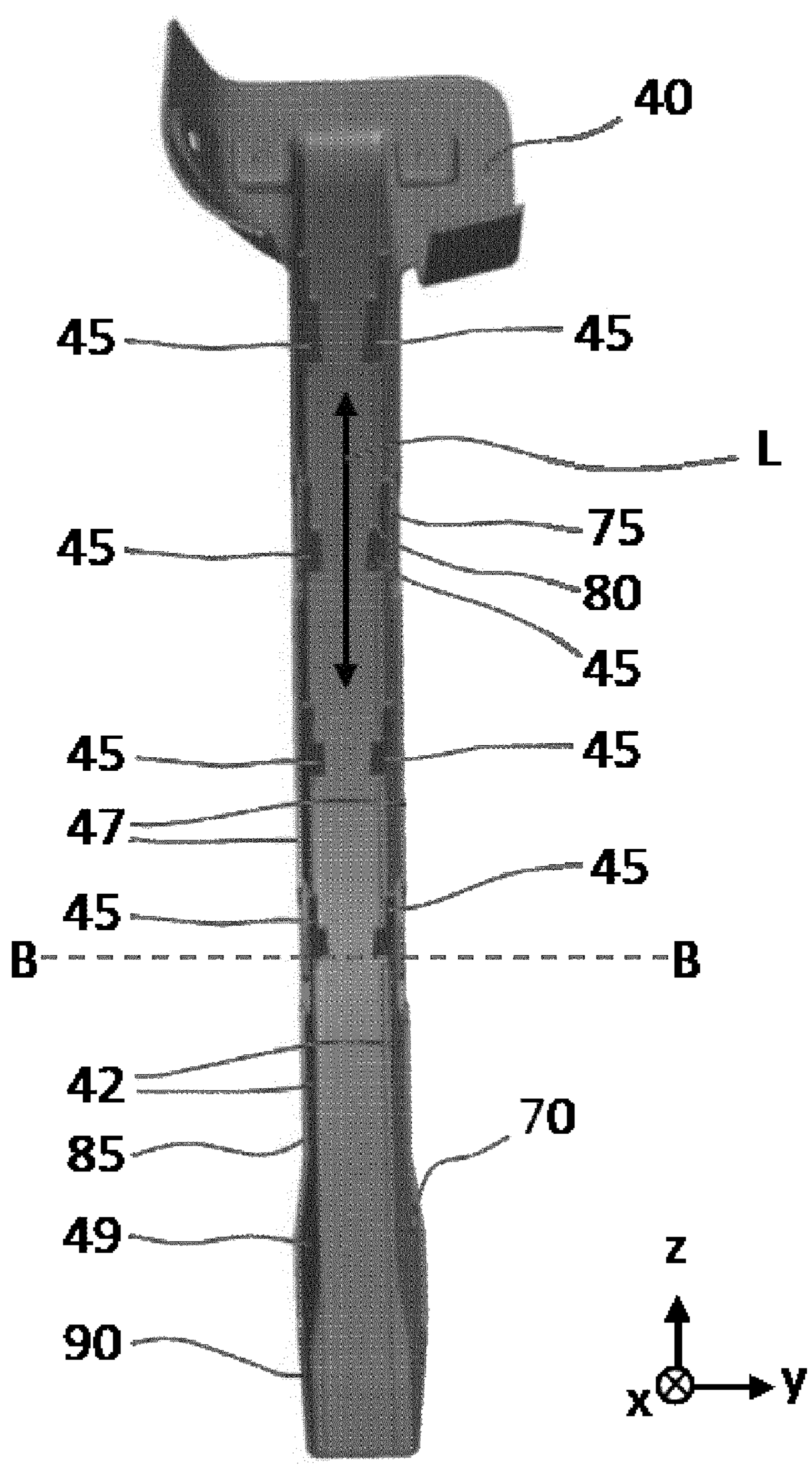
FIG. 4 shows a portion of a curved hinge cover from the inner side.

In FIG. 4, a portion of a curved hinge cover 25 is shown from the inner side. With the upper portion thereof which is constructed in a head-like manner, the curved hinge cover 40 is secured to the luggage compartment trim (not illustrated here) in the region of the luggage compartment cover 30. When viewed in the longitudinal direction L thereof, at the left and right there are in a symmetrical arrangement four support portions 45 which are constructed in a virtual x-y plane in each case in a substantially L-shaped manner. Each of the L-shaped support portion 45 is located with the respective abutment portion 75 or abutment portion 80 thereof in the mounted state on the curved hinge member 35 which is not shown in this Figure. It should be noted that in FIG. 4 only one support portion 45 is provided with reference numerals for the abutment portion 75 or abutment portion 80 but all the support portions 45 each have an abutment portion 75 or abutment portion 80.

The support portions 45 are, when viewed in the longitudinal direction L, arranged in a state distributed from the region adjacent to a luggage compartment cover 35 up to a lower region B. The corresponding path is substantially two-thirds of the overall length of the curved hinge cover 40. At the other side of a virtual border which separates the lower region, consequently in the direction of the portion of the curved hinge cover 40 which in the assembled state is adjacent to the luggage compartment cover 10, no support portions 45 are provided so that this region is constructed to be less rigid compared with the region adjacent to the luggage compartment cover 35. In a relatively even more remote portion, there is provided an expanding portion 49 which is in the form of a continuous path 70 and which, in the assembled state and in the open position of the luggage compartment cover 30 which is not shown in this instance, substantially abuts against the wall 15. As can be seen, the portion 49 has at this location its greatest width or extent in a virtual x-y plane. Above and below the portion 49 in contrast the respective widths or extents are smaller, as indicated by the reference numerals 85 and 90.

Figure 5:
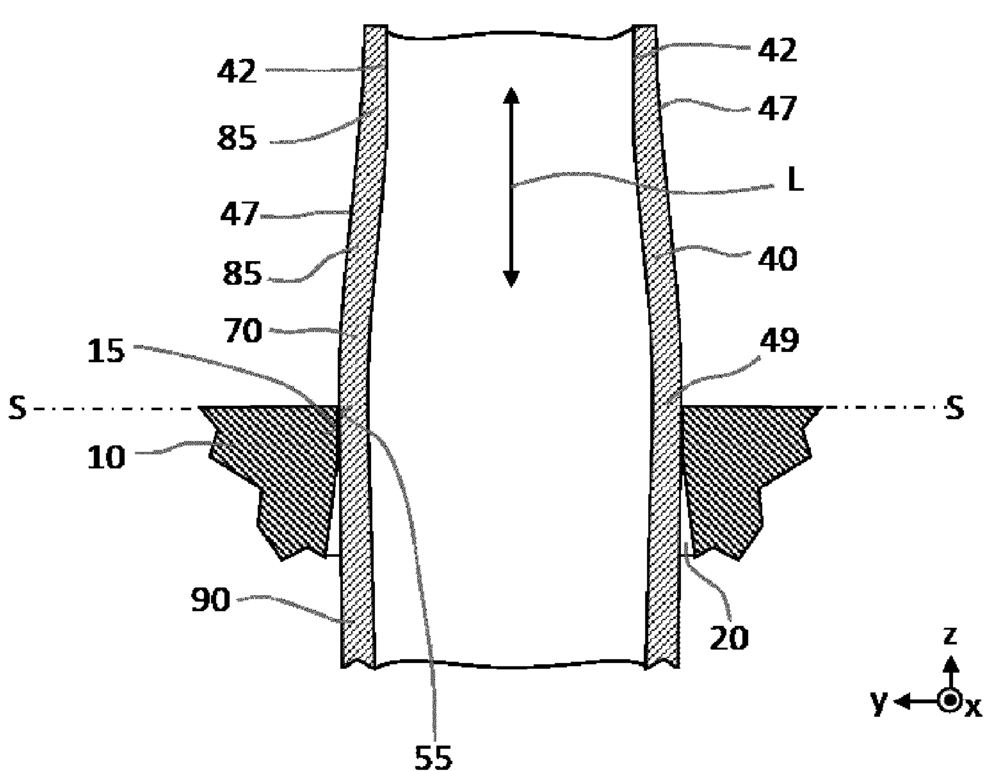
FIG. 5 shows an enlarged cross section view of an alternative embodiment of a partially illustrated curved hinge cover in the region of a guiding portion.

In FIG. 5, an enlarged cross section view of an alternative embodiment of a partially depicted curved hinge cover 40 is shown in the region of a guiding portion 55, wherein for reasons of clarity the curved hinge 35 itself is not shown and the support portions 45 which are provided per se are not visible as a result of the selected image cut-out. The expanding portion 49 is in the form of a continuous path 70, the greatest extent or width of which can be found in a virtual x-y plane in the region of the curved hinge cover 40 which abuts against the wall 15 in the upright state of the luggage compartment cover 30 as shown in this instance. The extent of the portion 85 located above it or portion 90 located below it are in contrast smaller and enable a movement of the curved hinge cover 40 in a substantially free and consequently low-noise manner but in a manner spatially controlled by the guiding portion 55.

It should be noted that the portion of the passenger vehicle 1 as shown in FIGS. 1 and 3 virtually constitutes the starboard side thereof. The statements set out above apply, however, in a similar manner, to the port side which is not shown in this instance and which also has a curved hinge apparatus 25 according to the invention, the structure of which corresponds to the structure of a curved hinge apparatus 25 which is shown in FIG. 1 or FIG. 3 but which is mirrored on the longitudinal center plane (x-z plane).

LIST OF REFERENCE CHARACTERS

1 Passenger vehicle
5 Luggage compartment
10 Luggage compartment trim
15 Wall
20 Opening
25 Curved hinge apparatus
30 Luggage compartment cover
35 Curved hinge
40 Curved hinge cover
42 Inner side
45 Support portion
47 Outer side
49 Expanding portion
50 Step
55 Guiding portion
60 Planar face
65 Gap
70 Continuous path
75 Abutment portion
80 Abutment portion
85 Portion
90 Portion
B-B Border upper/lower region
L Longitudinal direction
S-S Viewing range limit
x, y, z Coordinates of a Cartesian coordinate system according to ISO 4130-1978

The invention claimed is:

1. A curved hinge apparatus, comprising:

a curved hinge on which a luggage compartment cover of a passenger vehicle is mountable, wherein, in an installed position of the curved hinge apparatus in the passenger vehicle, the curved hinge is movable between an open position and a closed position through an opening which is located in a luggage compartment trim of the passenger vehicle and which is delimited by a wall; and a curved hinge cover, wherein the curved hinge is surrounded by the curved hinge cover and wherein the curved hinge cover is fixed in position with respect to the curved hinge;

wherein an outer side of the curved hinge cover has, in a region facing away from the luggage compartment cover in the installed position, a portion which expands in a longitudinal direction of the curved hinge cover and which is configured to close the opening in the open position in the installed position;

wherein an inner side of the curved hinge cover has a support portion which abuts at least partially against an outer side of the curved hinge;

wherein the support portion, when viewed in the longitudinal direction of the curved hinge cover, is spaced apart from the portion of the curved hinge cover;

wherein the portion of the curved hinge cover is in a form of a continuous path which protrudes from the curved hinge cover, wherein a greatest width of the portion is located in a region of the curved hinge cover which abuts against the wall in an upright state of the luggage compartment cover, wherein an extent of a first portion located above the greatest width of the portion and an extent of a second portion located below the greatest width of the portion have a smaller width than the greatest width.

2. The curved hinge apparatus according to claim 1, wherein a guiding portion extends from the portion in the longitudinal direction of the curved hinge cover.

3. The curved hinge apparatus according to claim 1, wherein the support portion is a web which protrudes from the curved hinge cover.

4. A passenger vehicle, comprising:

a luggage compartment which has a luggage compartment trim and which is selectively openable or closable by a luggage compartment cover, wherein the luggage compartment trim has an opening which is delimited by a wall; and a curved hinge apparatus which has a curved hinge and a curved hinge cover;

wherein the luggage compartment cover is mounted on the curved hinge and wherein the curved hinge is movable between an open position and a closed position through the opening;

wherein the curved hinge is surrounded by the curved hinge cover and wherein the curved hinge cover is fixed in position with respect to the curved hinge;

wherein an outer side of the curved hinge cover has, in a region facing away from the luggage compartment cover, a portion which expands in a longitudinal direction of the curved hinge cover and which closes the opening in the open position;

wherein an inner side of the curved hinge cover has a support portion which abuts at least partially against an outer side of the curved hinge;

wherein the support portion, when viewed in the longitudinal direction of the curved hinge cover, is spaced apart from the portion of the curved hinge cover;

wherein the portion of the curved hinge cover is in a form of a continuous path which protrudes from the curved hinge cover, wherein a greatest width of the portion is located in a region of the curved hinge cover which abuts against the wall in an upright state of the luggage compartment cover, wherein an extent of a first portion located above the greatest width of the portion and an extent of a second portion located below the greatest width of the portion have a smaller width than the greatest width.

5. The passenger vehicle according to claim 4, wherein the wall starting from a side opposite the luggage compartment cover tapers in a direction of the luggage compartment cover.

6. The passenger vehicle according to claim 4, wherein a guiding portion of the portion abuts in the open position against the wall.

7. A passenger vehicle, comprising:

a luggage compartment which has a luggage compartment trim and which is selectively openable or closable by a luggage compartment cover, wherein the luggage compartment trim has an opening which is delimited by a wall; and a curved hinge apparatus which has a curved hinge and a curved hinge cover;

wherein the luggage compartment cover is mounted on the curved hinge and wherein the curved hinge is movable between an open position and a closed position through the opening;

wherein the curved hinge is surrounded by the curved hinge cover and wherein the curved hinge cover is fixed in position with respect to the curved hinge;

wherein an outer side of the curved hinge cover has, in a region facing away from the luggage compartment cover, an expanded portion which closes the opening in the open position;

wherein an inner side of the curved hinge cover has a support portion which abuts at least partially against an outer side of the curved hinge;

wherein the support portion, when viewed in the longitudinal direction of the curved hinge cover, is spaced apart from the portion of the curved hinge cover;

wherein the wall starting from a side opposite the luggage compartment cover tapers in a direction of the luggage compartment cover.

* * * * *